United States Patent Office 3,338,818
Patented Aug. 29, 1967

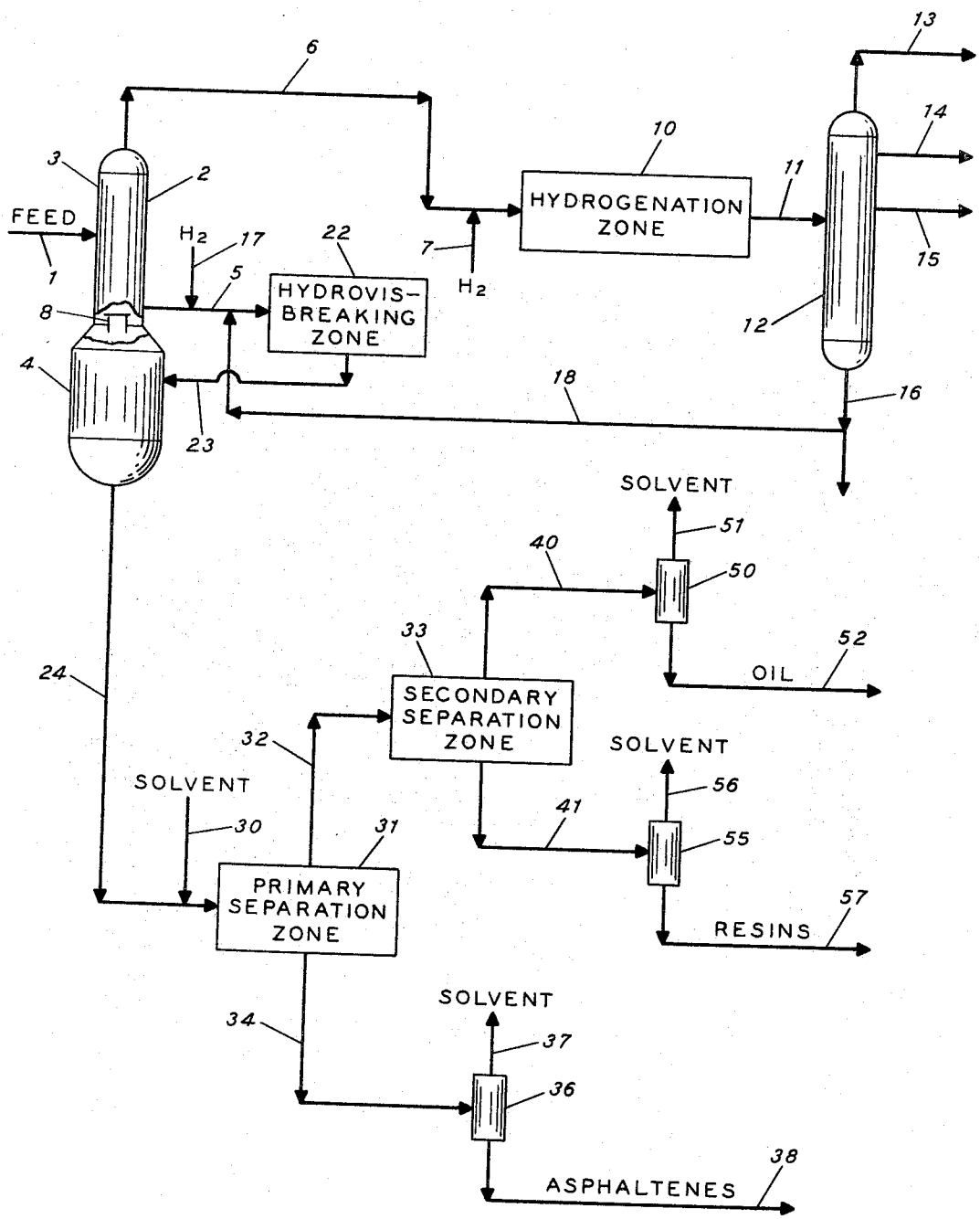

3,338,818
PROCESS FOR CONVERTING ASPHALTENE-CONTAINING HYDROCARBON FEEDS
Norman J. Paterson, San Rafael, Calif., assignor to Chevron Research Company, a corporation of Delaware
Filed June 3, 1965, Ser. No. 461,081
8 Claims. (Cl. 208—58)

The present invention is directed to a process for converting a hydrocarbon feed containing asphaltic and metalliferous materials to obtain more valuable products. More particularly, this invention is directed to a process for converting asphaltic feeds to obtain an asphaltene-free fraction and an asphaltene fraction. Still more particularly, this invention is directed to a process for converting and separating asphaltic feeds into hydrovisbroken fractions and solvent separated oil, resin and asphaltene fractions.

The solvent separated oil, resin and asphaltene fractions refer to broad categories of constituents in bituminous materials. The exact composition of each fraction is dependent on the particular asphalt-type bituminous materials used as feed and the particular solvent and conditions used to carry out the feed separation. The three fractions differ in their physical and chemical behavior. The asphaltene fraction comprises weakly bound, high molecular weight polymers. The resin fraction comprises non-polymeric materials which surround the asphaltene molecules and have the tendency to readily polymerize to form asphaltenes. It is this tendency to polymerize that creates grave problems in the processing of asphaltic feeds. The oil fraction is the fraction that remains after the resins and asphaltenes have been removed from the asphaltic feed. The average molecular weight and structural complexity of the three fractions increase from the oil fraction to the resin fraction to the asphaltene fraction. However, it must be recognized that there are borderline components which may fall into one or the other fraction depending on the kind of solvent used in separating the asphaltic feed. When an asphaltic feed is treated with a normal pentane solvent, the undissolved portion precipitating out of solution is classified as "normal pentane asphaltenes." The fractions soluble in the normal pentane solution are called maltenes and consist of the resin and oil constituents. The resin fraction may be precipitated from the maltene fraction by increasing the temperature of the separation system leaving the oil fraction in the solvent solution.

The petroleum refiner currently faces the problem of processing heavy feed stocks containing asphaltenes and metalliferous contaminants to obtain higher yields of salable products. The processing is especially difficult where the feed stocks contain 2% or more asphaltenes and 25 p.p.m. or more metals. One cannot economically process such feed stocks in conventional catalytic cracking zones because the asphaltenes and metals rapidly coke and poison the cracking catalyst.

The prior art shows various deasphalting processes to convert asphaltic feeds into salable products including oil, resin and asphaltene fractions. However, by deasphalting alone one is not able to obtain high yields of asphaltene-free materials having metal levels sufficiently low, i.e., less than 1 p.p.m., to be used as products per se or as feed to subsequent catalytic conversion processes. Consequently, it was necessary for prior art processes to reject considerable quantities of potential oil to asphaltenes.

The prior art shows various thermal cracking processes to convert residual oils into more valuable products. Visbreaking has been found to be an effective method of increasing the yield of gasoline at the expense of residual oils. However, by visbreaking alone one cannot achieve the desired high yields of distillate products. This is true because if one tries to increase the high yield in such visbreaking operations the production of unstable fuel oil and tar is increased and the apparatus becomes coked. That is, at the higher severities necessary to increase the yield of distillate products undesirable polymerization and condensation reactions occur to form the undesirable fuel oil, tar and coke.

The prior art also shows subjecting asphaltene-containing reduced crudes to conventional visbreaking, deasphalting and hydrogenation in order to obtain gasoline and furnace oil. However, by this combination of processes one cannot economically produce high yields of the visbroken fraction at the expense of asphaltenes.

In contrast to these prior processes, the present invention is directed to a process for obtaining a more efficient and selective separation of a hydrocarbon feed containing asphaltenes and metalliferous contaminants into an asphaltene-free fraction and an asphaltene fraction and preferably into hydrovisbroken fractions and solvent separated oil, resin and asphaltene fractions. This invention provides improvements over known deasphalting processes whereby the production of hydrovisbroken gas oils having very low metal levels can be maximized and the production of asphaltenes and heavy solvent deasphalted oils can be minimized. The resultant hydrovisbroken gas oils may then be more economically converted into gasoline and middle distillates by catalytic conversion.

Among the advantages of the process of the present invention are that it provides a more efficient hydrocarbon conversion process for removing asphaltenes and metals from a hydrocarbon feed than prior art processes. The hydrocarbon feed is converted into materials that are more selectively separated into a deasphalted fraction and an asphaltene fraction, and more preferably into oil, resin and asphaltene fractions. The process can maximize the conversion of a heavy asphaltic feed to asphaltene-free materials boiling above the gasoline boiling range and below 900° F., minimize the conversion of the feed to asphaltenes, and minimize the conversion of the feed to gasoline and lighter materials.

These and other advantages are obtainable in the process of the present invention for converting a hydrocarbon feed boiling at least partly above 900° F. and containing at least 2 wt. percent asphaltenes and at least 25 p.p.m. metals, when a thermal cracking zone is operated in the novel manner disclosed herein whereby a higher yield of an asphaltene-free fraction is obtained from the thermal cracking zone effluent and an asphaltene-containing residuum from the effluent is made more amenable to selective separation. The process comprises converting in the thermal cracking zone above 50 vol. percent of the portion of the feed boiling above 900° F. to materials boiling below 900° F. in the presence of hydrogen and an added paraffinic hydrocarbon stock and separating from the effluent from said thermal cracking zone a substantially asphaltene-free fraction boiling below 900° F. and a residuum fraction boiling above 600° F. The paraffinic hydrocarbon stock comprises hydrocarbons boiling above 500° F., having a UOP "K" characterization factor above 11.5 and preferably above 12.0 and containing less than 25 vol. percent aromatics. The thermal cracking zone is operated at conditions to convert no more than 15 vol. percent of the feed to products boiling below 400° F.

In accordance with another embodiment of the present invention, there is provided a process for converting the hydrocarbon feed to obtain in addition to the substantially asphaltene-free fraction, a solvent deasphalted oil and an asphaltene fraction which comprises separating the residuum fraction recovered from the thermal cracking zone in a solvent separation zone into the deasphalted oil and the asphaltene fraction.

In accordance with still another embodiment of the present invention, there is provided a process for converting the hydrocarbon feed to at least one substantially asphaltene-free fraction boiling above about 600° F. which comprises converting the hydrocarbon feed in a thermal cracking zone in a manner described in the above statement of the invention and removing the asphaltenes from at least a substantial portion of the resulting reaction products from the thermal cracking zone to produce the substantially asphaltene-free fraction.

In accordance with a more preferred embodiment of the present invention, there is provided a process which comprises converting the hydrocarbon feed in the presence of a hydrogenation zone bottoms fraction in a hydrovisbreaking zone operating at the conditions described above in connection with the thermal cracking zone, separating from the effluent from the hydrovisbreaking zone a substantially asphaltene-free fraction boiling below about 800° F. and a residuum fraction boiling above 600° F., hydrogenating the substantially asphaltene-free fraction in the presence of hydrogen in a hydrogenation zone, recovering from the hydrogenation zone a bottoms fraction having the same characteristics as the hydrocarbon stock described in the above statement of the invention, adding the bottoms fraction to the hydrovisbreaking zone, separating the residuum fraction from the hydrovisbreaking zone into a solvent-deasphalted oil phase and an asphaltene-solvent phase with a low boiling hydrocarbon solvent in a solvent separation zone and recovering a deasphalted oil and an asphaltene fraction from the respective phases. The hydrogenation zone is operated at conditions to substantially hydrogenate olefinic and aromatic components in the substantially asphaltene-free fraction and to convert no more than 10 vol. percent of the latter fraction to products boiling below 400° F.

In a still more preferred embodiment of the present invention the residuum fraction from the hydrovisbreaking zone is separated into oil, resin and asphaltene fractions in a two-stage solvent separation zone with a low boiling hydrocarbon solvent.

The present invention will be more clearly understood, and further objects and advantages thereof will be apparent, from the following detailed description, when read in connection with the accompanying drawing. The drawing is a diagrammatic illustration of an embodiment of process units and flow paths suitable for carrying out the process of the present invention.

The process of the present invention is capable of converting residual feeds from a wide variety of petroleum crude hydrocarbons into high yields of products, catalytic conversion feed stocks, and asphalt blending stocks. The process is also capable of converting residual oils recovered from shale, gilsonite, tar sands, low temperature carbonization of coal and the like. The process is particularly effective in converting low gravity asphaltic and naphthenic hydrocarbons having at least 2 wt. percent asphaltenes and at least 25 p.p.m. metalliferous contaminants calculated as metals, usually comprising nickel and vanadium, and boiling above about 600° F. and at least partly above 900° F. However, full boiling range hydrocarbon oils may first be fed to a topping column to remove the fraction boiling below about 800° F. The residual material boiling in the range of 600° F. to above 900° F. from the topping column is then fed to the hydrovisbreaking zone.

The hydrovisbreaking zone may comprise a tubular heating coil containing convection and radiant sections and in certain applications a soaking coil section. Preferably, the hydrovisbreaking zone consists of a reaction vessel and a tubular heating coil. The vessel contains baffles and contacting means to insure intimate mixing of the asphaltic feed with hydrogen and the paraffinic hydrocarbon stock or preferably the hydrogenation zone bottoms fraction. The heating coil is operated at conditions in the range of 600°–950° F., 100–3000 p.s.i.g. and a hydrogen recycle rate of 1000–10,000 s.c.f. per bbl. of feed. The hydrovisbreaking zone is designed to convert no more than 15 vol. percent of the fresh feed to products boiling below 400° F. and to convert above 50 vol. percent of the 900° F.+ materials in the feed to materials boiling below 900° F. A large portion of the materials in the feed boiling over 775° F. is converted to middle distillates and gas oil boiling below about 775° F. The hydrovisbreaking zone also is designed to hydrogenate the unstable components in the feed to prevent their polymerization and condensation to coke and high boiling polymers. The hydrogen and hydrocarbons boiling above 500° F., having a UOP "K" characterization factor above 11.5 and preferably above 12.0 and containing less than 25 vol. percent aromatics, cause the asphaltene fractions in the hydrovisbreaking zone feed to be preferentially cracked at relatively low temperatures, i.e., 600°–775° F., into the oil and resin fractions. The less reactive resin and oil fractions in the feed are then reduced into lower boiling hydrocarbons with very little production of gasoline and lighter boiling materials. The gasoline produced in the hydrovisbreaking zone is of low quality and generally is not suitable for use in gasoline blending without catalytic reforming.

The paraffinic hydrogenation zone bottoms having the properties described in the preceding paragraph are added to the feed to the hydrovisbreaking zone in an amount of at least 1 volume per 10 volumes of feed. Below this amount little improvement results in the production of the desired asphaltene-free fractions. Above about 10 volumes of hydrogenation zone bottoms per 10 volumes of feed little additional improvement results to warrant the expense in providing for such large quantities of bottoms. The presence of the hydrogenation zone bottoms is effective in stopping the chain reactions that take place in the hydrovisbreaking zone. This prevents the buildup of additional asphaltenes from the decomposition of resins. The unstable hydrocarbon fragments formed in the hydrovisbreaking zone are rapidly hydrogenated as they are formed to prevent their condensation and polymerization to coke. The presence of the paraffinic-type hydrogenation zone bottoms initially causes the asphaltenes in the feed to the hydrovisbreaking zone to precipitate into a state that permits selectively hydrovisbreaking the asphaltenes at lower temperatures than the rest of the feed. The unconverted asphaltenes in the asphaltic residue remain in the precipitated state as they are fed into the separation zone. Thus, the addition of the hydrogenation zone bottoms to the hydrovisbreaking zone results in an overall reduction of asphaltenes and permits the asphaltic residue from the hydrovisbreaking zone to be more easily separated into a deasphalted fraction and as asphaltene fraction.

The solvent separation zone is used to separate the asphaltic residue from the hydrovisbreaking zone into at least a deasphalted fraction and an asphaltene fraction and preferably an oil fraction, a resin fraction and an asphaltene fraction. The solvent separation may be a batch operation using one or more treating vessels or a continuous liquid-liquid countercurrent operation using a treating tower having baffles or rotating disc contactors. The asphaltic residue having an initial boiling point above about 650° F. and preferably above about 750° F. is introduced into the top of the particular treating vessel used and contacted with a suitable deasphalting solvent. The deasphalting solvent may be any of the conventional solvents and preferably such solvents as aliphatic hydrocarbons having between 2–8 carbon atoms per molecule or a mixture of such hydrocarbons. Certain additives such as aromatic wash oils, inorganic acids and halogens may be added to the solvent to improve the deasphalting operation by increasing the yield and quality of the deasphalted fraction which is free of metallic contaminants and asphaltic materials. A commercial deasphalting solvent is propane or a mixture of 65 vol. percent and 35 vol. percent butanes. However, it has been found that the higher molecular weight aliphatic hydrocarbons, i.e., $C_4$–$C_8$ hydrocarbons or mixtures thereof, are preferred in the process of the present invention because they retain larger amounts of resins with the oil fraction in the extract phase. It is preferred to solvent deasphalt in a primary zone and a secondary zone. In the primary solvent separation zone the asphaltenes and the high molecular weight aromatics are separated from the resin and oil fractions in the feed. The primary zone is operated at any suitable combination of temperatures and pressures such that the solvent remains in the liquid phase. Temperatures are generally not greater than 50° F. below the critical temperature of the particular solvent used and hence in the range of about 150°–375° F. Pressures are dependent on both the particular solvent used and the composition of the feed, and hence in the range of 300–800 p.s.i.g. The solvent to feed ratio is generally in the range of about 2–12. In the secondary solvent separation zone the solvent-rich phase of maltenes from the primary zone is separated into an oil fraction and a resin fraction. The secondary zone is maintained at the same pressure as in the primary zone and heated to the equilibrium temperature of the particular solvent at the given pressure in order to precipitate out the resins from the extract phase. Equilibrium temperature is the actual saturation temperature of the solvent used at the given pressure, if the temperature is below the critical, and is the temperature corresponding to the given pressure as determined from a Cox vapor pressure curve, if the temperature is above the critical.

The resultant oil fraction may be used as a lubricating oil or it may be further converted into salable products such as gasoline and middle distillates by conventional means such as catalytic cracking. The resultant resin fraction may be converted into gasoline and middle distillates by conventional means such as thermal cracking. The resultant asphaltene fraction may be used to reconstitute asphaltene-deficient stocks to produce salable asphalts. The oil, resin and asphaltene fractions may be reblended and air-blown to obtain improved asphalts.

The hydrogenation zone is operated to produce a highly paraffinic bottoms boiling above 550° F. to be used in the hydrovisbreaking zone. The feed to this zone may be a full boiling range straight run or thermally cracked stock. The hydrogenation zone may be operated under conventional hydrogenation conditions of 550°–750° F., 250–3000 p.s.i.g., 0.1–10 LHSV and a hydrogen recycle rate of 1000–5000 s.c.f. per barrel of feed with a conventional hydrogenation catalyst. Such a catalyst comprises a hydrogenating-dehydrogenating component and a nonacidic cracking component. The hydrogenating component preferably comprises at least one of the Group VI metals or compounds thereof and at least one of the Group VIII metals or compounds thereof. The nonacidic cracking component comprises silica, titania, zirconia, bauxite charcoal or alumina. The preferred catalyst is a sulfided cobalt-molybdenum-alumina catalyst as prepared in a manner set forth in Patent No. 2,878,193. The hydrogen consumption rate for the full boiling range feed stocks to the hydrogenation zone is at least 700 s.c.f. per barrel of feed. The hydrogenation zone is operated to remove at least 99% of the sulfur and at least 80% of the nitrogen in the feed, and to saturate the olefins and aromatics in the feed. There is a conversion of about 10 vol. percent of the 700° F.+ materials in the feed to products boiling below 700° F. because of the splitting reactions that occur during desulfurization and denitrification. However, the operating conditions are fixed to limit the conversion to gasoline to less than 10 vol. percent.

Referring now to the drawing there is shown a simplified process flow diagram suitable for carrying out the process of the present invention.

50,000 barrels per stream day (b.p.s.d) of 10.1° API Boscan (Venezuela) crude oil is fed through line 1 to section 2 of the fractionating column 3. The crude oil contains about 5.5 wt. percent sulfur, about 1200 p.p.m. vanadium, about 150 p.p.m. nickel, about 50 lbs. sodium chloride per 1000 barrels of crude, about 15 lbs. calcium sulfate per 1000 barrels of crude, and about 20 wt. percent n-pentane asphaltenes. Preferably, the crude is treated to remove the sodium chloride and calcium sulfate deposits in the crude oil. Column 3 is designed to strip as much of the whole crude as possible without carrying any of the asphaltenes or metals overhead or without decomposing the crude. A hydrogen-containing gas preferably is added to section 4 of fractionating column 3 to aid in the stripping of the crude in section 2 which is in vapor communication with section 4. About 35,500 b.p.s.d. of the stripped crude oil is removed from total liquid draw off tray 8 at the bottom of section 2 through line 5. The fraction boiling below about 775° F. is removed from the top of section 2 through line 6, combined with hydrogen in line 7 and passed into hydrogenation zone 10. The 775° F.− fraction is hydrogenated in zone 10 with a conventional hydrogenation catalyst and at conventional operating conditions. Ammonia, hydrogen sulfide, hydrogen and $C_4$− light gases are removed from the effluent from zone 10 in processing units not shown. The remaining effluent from zone 10 is passed through line 11 to fractionating column 12. A $C_5$–180° F. light gasoline product is removed from the top of column 12 through line 13 to storage. A 180°–400° F. heavy gasoline product is removed through line 14 to storage or to further processing such as catalytic reforming. A 400°–700° F. fraction is removed through line 15 to product storage or to further processing. Portions of the 400°–700° F. fraction make high quality jet fuel and diesel fuel products. The paraffinic bottoms from column 12 boiling above about 700° F. having a UOP "K" characterization factor of at least 11.5, and containing less than 25 vol. percent aromatics are removed through line 16 to further process.

The stripped crude oil through line 5 is combined with hydrogen through line 17 and 4200 b.p.s.d. of the paraffinic hydrogenation zone bottoms through line 18 and passed to hydrovisbreaking zone 22. The effluent from zone 22 is quenched to about 700° F. and pressure reduced to 5–150 p.s.i.g. by means not shown, and the hydrovisbroken material through line 23 is introduced into section 4 of fractionating column 3. The hydrovisbroken fraction boiling below about 775° F. passes through openings in total liquid draw-off tray 8 into section 2 of fractionating column 3 and is passed overhead through line 6 with the 775° F.− fraction from the crude. The bottoms from hydrovisbreaking zone 22 are stripped with a hydrogen-containing gas to thoroughly remove the 775° F.− material. The efficiency of the subsequent solvent separation is improved if all 400° F.− material and preferably all the 775° F.− material has been stripped from the hydrovisbroken bottoms. Thus, the stripped, hydrovisbroken bottoms boiling above about 775° F. is removed from section 4 through line 24, mixed with a suitable solvent through line 30 and introduced into primary separation zone 31. A maltene-solvent phase is removed from primary separation zone 31 and passed through line 32 to secondary separation zone 33. An asphaltene-solvent phase is removed from primary separation zone 31 through line 34 and passed to solvent recovery zone 36 where the solvent is removed through line 37 and the asphaltene fraction is removed from the system through line 38. An oil-solvent phase containing the more paraffinic constituents in the hydrovisbreaking zone bottoms is removed from secondary separation zone 33 through line 40 and a resin-solvent phase is removed from zone 33 through line 41. The oil solvent phase is passed through line 40 to solvent recovery zone 50 where solvent is removed overhead through line 51 and the oil fraction boiling above about 775° F. is removed through line 52. The resin-solvent phase is passed through line 41 to solvent recovery zone 55 where solvent is removed through line 56 and the resins boiling above about 775° F. are removed through line 57.

Table I compares the liquid volume percent (LV percent) yield to products obtained by processing the 10.1° API Boscan crude oil in the process of the present invention, Case C, and in prior art processes, Cases A and B. Case A comprises separating the crude oil feed by crude distillation into an asphaltene-free fraction boiling below 775° F. and a residum fraction and solvent separating the residuum fraction into a maltene fraction and an asphaltene fraction. Case B comprises separating the feed in the same manner as in Case A, hydrovisbreaking the residuum fraction, separating the hydrovisbroken fraction into an asphaltene-free fraction boiling below 775° F. and an asphaltic residue and solvent separating the asphaltic residue into a maltene fraction and an asphaltene fraction. Case C comprises separating the feed in the same manner as Case A, hydrovisbreaking the residuum fraction in the presence of 1.18 volumes of the paraffinic hydrogenator bottoms boiling above about 700° F. per 10 volumes of the residum fraction, separating the hydrovisbroken fraction into an asphaltene-free fraction boiling below about 775° F. and an asphaltic residue boiling above about 775° F. and solvent separating the asphaltic residue into an oil fraction, a resin fraction, and an asphaltene fraction.

TABLE I

| Products, LV percent* | Prior Art | | Present Invention, Case C—Crude Distillation Hydrovisbreaking with Hydrogenator Bottoms and Solvent Separation |
|---|---|---|---|
| | Case A—Crude Distillation and Solvent Separation | Case B—Crude Distillation, Hydrovisbreaking and Solvent Separation | |
| 400° F. E.P. gasoline and lighter materials | 4.0 | 21.6 | 16.1 |
| 400°–775° F. middle distillates and gas oil | 25.0 | 41.0 | 74.9 |
| 775° F.+ maltene fraction | 53.0 | 26.0 | |
| 775° F.+ oil fraction | | | 9.0 |
| 775° F.+ resin fraction | | | 8.0 |
| Asphaltene fraction | 18.0 | 16.0 | 11.4 |
| Totals | 100.0 | 104.6 | 119.4 |

*Based on the crude oil feed.

Table I shows that by adding the hydrogenator bottoms to the hydrovisbreaking zone less gasoline and lighter materials are produced in the hydrovisbreaking zone, i.e., 16.1 LV percent for Case C compared with 21.6 LV percent for Case B. Table I shows that by adding the hydrogenator bottoms to the hydrovisbreaking zone more 400°–775° F. middle distillates and gas oil are produced in the hydrovisbreaking zone, i.e., 74.9 LV percent for Case C compared with 41 LV percent for Case B. Even after subtracting from the 400°–775° F. fraction all the hydrogenator bottoms added to the hydrovisbreaking zone, 25.5 LV percent more of this fraction are produced in Case C than in Case B. Table I shows that because the feed is hydrovisbroken in the presence of the hydrogenator bottoms, less asphaltenes are recovered from the asphaltene-containing fraction in the solvent separation zone, i.e., 11.4 LV percent for Case C compared with 16 LV percent for Case B and 18 LV percent for Case A. Table I shows that because the feed is hydrovisbroken in the presence of the hydrogenator bottoms, less maltenes are recovered from the asphaltene-containing fraction in the solvent separation zone, i.e., 17 LV percent for Case C compared with 26 LV percent BPSD for Case B and 53 LV percent BPSD for Case A. Table I also shows the 775° F.+ maltene fraction is separated into separate oil and resin fractions in the process in this invention as distinguished from Case A and Case B. This makes it possible to separately process the respective oil and resin fractions at more optimum conditions than is possible if the total maltene fraction is processed.

It has been found that by minimizing the production of gasoline having low quality and lighter materials and maximizing the production of the 400°–775° F. middle distillates and gas oil fraction in the hydrovisbreaking zone of the present invention, one can subsequently process the middle distillates and gas oil to more economically produce gasoline and middle distillates of a higher quality. It has also been found that by solvent separating the 775° F.+ material into oil, resin and asphaltene fractions, the three fractions may be more economically processed in subsequent steps.

The oil, resin and asphaltene fractions also make valuable products without further treatment. When the feed is a steam or vacuum reduced asphalt, the oil fraction has excellent lubricating properties and the resin fraction may be used in coating compositions and as extenders in plastic manufacture. The asphaltene fraction may be used in quick setting asphalt paving compositions. The oil, resin and asphaltene fractions may be blended into various compositions to be used as additives in order to modify the properties of asphalt-type materials. For example, improved asphalts may be obtained by blending the separated asphaltenes with the oil fraction from the same asphaltic feed or with other feeds. These blended or reconstituted asphalts have lower susceptibility to temperature change and have higher ductilities compared to asphalts produced from vacuum distillation.

Although only specific embodiments of the present invention have been described, numerous variations could be made in those embodiments without departing from the spirit of the invention, and all such variations that fall within the the scope of the appended claims are intended to be embraced thereby.

I claim:

1. A process for converting a hydrocarbon feed boiling at least partly above 900° F. and containing at least 2 wt. percent asphaltenes and at least 25 p.p.m. metals which comprises converting in a thermal cracking zone above 50 vol. percent of the portion of said feed boiling above 900° F. to materials boiling below 900° F. in the presence of added free hydrogen and hydrocarbons boiling above 500° F. having a UOP "K" characterization factor above 11.5 and containing less than 25 vol. percent aromatics, said hydrocarbons comprising at least a portion of the product of a hydrogenation zone containing a catalyst comprising a hydrogenating-dehydrogenating component and a nonacidic cracking component, the thermal cracking zone being operated at conditions to convert no more than 15 vol. percent of said feed to products boiling below 400° F., and separating from the effluent from said thermal cracking zone at least one substantially asphaltene-free fraction boiling below 900° F. and a residuum fraction boiling above 600° F.

2. A process as in claim 1 wherein said hydrocarbons are in an amount of at least 1.0 volume per 10 volumes of said hydrocarbon feed.

3. A process as in claim 1 wherein said residuum fraction is separated into a solvent-deasphalted oil phase and an asphaltene-solvent phase in a solvent separation zone.

4. A process as in claim 3 wherein the solvent in said solvent separation zone is selected from the group consisting of $C_2$–$C_8$ hydrocarbons and mixtures thereof.

5. In a process comprising the step of thermal cracking in the presence of added free hydrogen a hydrocarbon feed boiling within the range 600° F. to about 900° F., and containing at least 2 wt. percent asphaltenes and at least 25 p.p.m. metals, and the step of removing asphaltenes from at least a substantial portion of the resulting reaction products, to produce at least one substantially asphaltene-free fraction boiling above about 600° F., the improvement which comprises converting in said thermal cracking step in the presence of an added hydrocarbon stock above 50 vol. percent of the portion of said feed boiling above 900° F. to materials boiling below 900° F., said hydrocarbon stock comprising hydrocarbons boiling above 500° F., having a UOP "K" characterization factor above 11.5, containing less than 25 vol. percent aromatics, and comprising at least a portion of the product of a hydrogenation zone containing catalyst comprising a hydrogenating-dehydrogenating component and a nonacidic cracking component, said thermal cracking step being operated at conditions to convert no more than 15 vol. percent of said feed to products boiling below 400° F.

6. A process for converting a hydrocarbon feed boiling within the range 600° F. to above 900° F. and containing at least 2 wt. percent asphaltenes and at least 25 p.p.m. metals which comprises converting in a hydrovisbreaking zone above 50 vol. percent of the portion of said feed boiling above 900° F. to materials boiling below 900° F. in the presence of added free hydrogen and a hydrogenation zone bottoms fraction obtained as hereinafter specified, said hydrovisbreaking zone being operated at conditions to convert no more than 15 vol. percent of said feed to products boiling below 400° F., separating from the effluent from said hydrovisbreaking zone a substantially asphaltene-free fraction boiling below about 800° F. and a residuum fraction boiling above 600° F., hydrogenating said substantially asphaltene-free fraction in the presence of hydrogen in a hydrogenation zone containing a catalyst comprising a hydrogenating-dehydrogenating component and a nonacidic cracking component to substantially hydrogenate olefinic and aromatic components in said asphaltene-free fraction, said hydrogenation zone being operated at conditions to convert no more than 10 vol. percent of said asphaltene-free fraction to products boiling below 400° F., recovering from said hydrogenation zone a bottoms fraction boiling above 500° F., having a UOP "K" characterization factor above 11.5 and containing less than 25 vol. percent aromatics, adding said bottoms fraction to said hydrovisbreaking zone, separating said residuum fraction from said hydrovisbreaking zone into a solvent-deasphalted oil phase and an asphaltene-solvent phase with a low boiling hydrocarbon solvent in a solvent separation zone and recovering a deasphalted oil and an asphaltene fraction from the respective phases.

7. A process for converting a full boiling range hydrocarbon feed containing at least 2 wt. percent asphaltenes and at least 25 p.p.m. metals which comprises separating said feed into a fraction boiling below about 800° F. and a residuum fraction boiling within the range 600° F. to above 900° F., converting in a hydrovisbreaking zone above 50 vol. percent of the portion of said residuum fraction boiling above 900° F. to materials boiling below 900° F. in the presence of added free hydrogen and a hydrogenation zone bottoms fraction obtained as hereinafter specified, said hydrovisbreaking zone being operated at conditions to convert no more than 15 vol. percent of said residuum fraction to products boiling below 400° F., separating from the effluent from said hydrovisbreaking zone a substantially asphaltene-free fraction boiling below about 800° F. and a residuum fraction boiling above about 600° F., hydrogenating both of said fractions boiling below about 800° F. in the presence of hydrogen in a hydrogenation zone containing a catalyst comprising a hydrogenating-dehydrogenating component and a nonacidic cracking component to substantially hydrogenate olefinic and aromatic components in said fractions, said hydrogenation zone being operated at conditions to convert no more than 10 vol. percent of said fractions to products boiling below 400° F., recovering from said hydrogenation zone a bottoms fraction boiling above 500° F., having a UOP "K" characterization factor above 11.5 and containing less than 25 vol. percent aromatics, adding said bottoms fraction to said hydrovisbreaking zone, separating said residuum fraction from said hydrovisbreaking zone into a solvent-deasphalted oil phase and an asphaltene-solvent phase with a low boiling hydrocarbon solvent in a solvent separation zone and recovering a deasphalted oil and an asphaltene fraction from the respective phases.

8. A process as in claim 7 wherein said residuum fraction from said hydrovisbreaking zone is separated into a solvent-deasphalted oil phase and an asphaltene-solvent phase in a primary solvent separation zone, wherein said solvent-deasphalted oil phase is separated into a solvent-oil phase and a resin-solvent phase in a secondary solvent separation zone, and wherein an oil fraction, a resin fraction and an asphaltene fraction are recovered from the respective solvent-oil, resin-solvent, and asphaltene-solvent phases.

References Cited

UNITED STATES PATENTS

| | | | |
|---|---|---|---|
| 2,276,155 | 3/1942 | Carr | 208—6 |
| 2,854,398 | 9/1958 | Knox | 208—80 |
| 3,147,206 | 9/1964 | Tulleners | 208—56 |
| 3,238,118 | 3/1966 | Arey et al. | 208—56 |

DELBERT E. GANTZ, *Primary Examiner.*

ABRAHAM RIMENS, *Examiner.*